United States Patent [19]

Golden et al.

[11] 4,036,688

[45] July 19, 1972

[54] APPARATUS FOR CONTROLLING MOLTEN CORE DEBRIS

[75] Inventors: Martin P. Golden, Trafford; Roger W. Tilbrook, Monroeville; Neal F. Heylmun, Pittsburgh, all of Pa.

[73] Assignee: The United States of America as represented by the United States Energy Research and Development Administration, Washington, D.C.

[21] Appl. No.: 566,489

[22] Filed: Apr. 9, 1975

[51] Int. Cl.² ............................................. G21C 9/00
[52] U.S. Cl. ..................................... 176/38; 176/40; 176/87
[58] Field of Search ....................... 176/37, 38, 87, 40

[56] References Cited

U.S. PATENT DOCUMENTS

| | | | |
|---|---|---|---|
| 3,314,859 | 4/1967 | Anthony | 176/50 |
| 3,607,630 | 9/1971 | West et al. | 176/38 |
| 3,629,064 | 12/1971 | Zivi | 176/38 |
| 3,664,923 | 5/1972 | Connolly | 176/40 |
| 3,702,802 | 11/1972 | Jansen, Jr. | 176/38 |
| 3,719,556 | 3/1973 | Snyder, Jr. et al. | 176/38 |

OTHER PUBLICATIONS

Transactions ANS vol. 13, No. 1, 6/26/70; "Fast Reactor Fuel . . . Melt Down"; Jansen et al.; p. 376.

*Primary Examiner*—Samuel W. Engle
*Assistant Examiner*—Ralph Palo

[57] ABSTRACT

Apparatus for containing, cooling, diluting, dispersing and maintaining subcritical the molten core debris assumed to melt through the bottom of a nuclear reactor pressure vessel in the unlikely event of a core meltdown. The apparatus is basically a sacrificial bed system which includes an inverted conical funnel, a core debris receptacle including a spherical dome, a spherically layered bed of primarily magnesia bricks, a cooling system of zig-zag piping in graphite blocks about and below the bed and a cylindrical liner surrounding the graphite blocks including a steel shell surrounded by firebrick. Tantalum absorber rods are used in the receptacle and bed.

9 Claims, 22 Drawing Figures

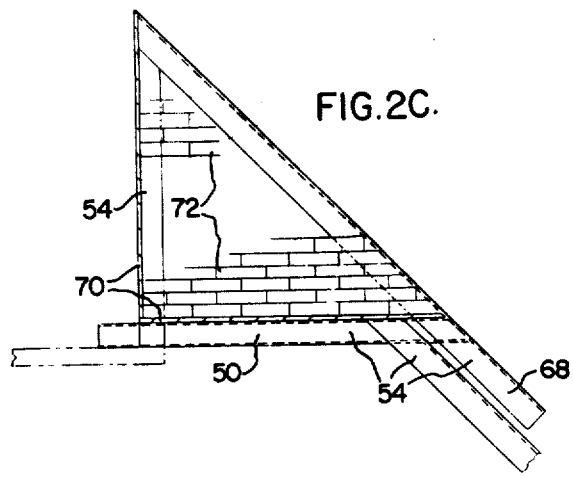
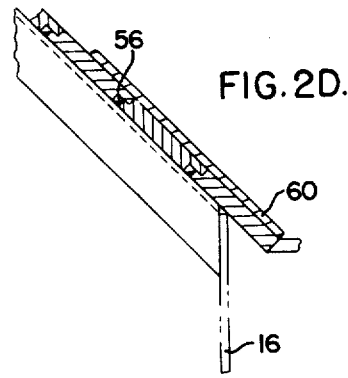
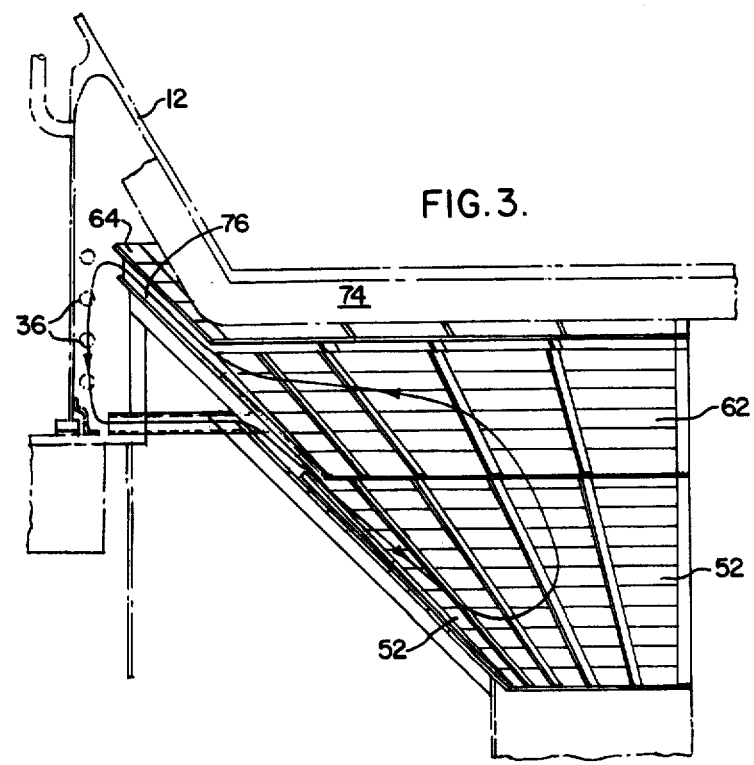

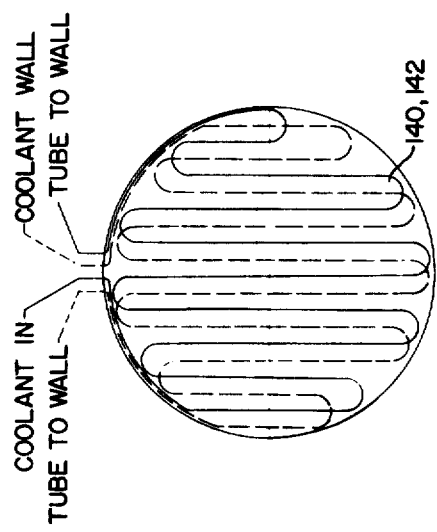
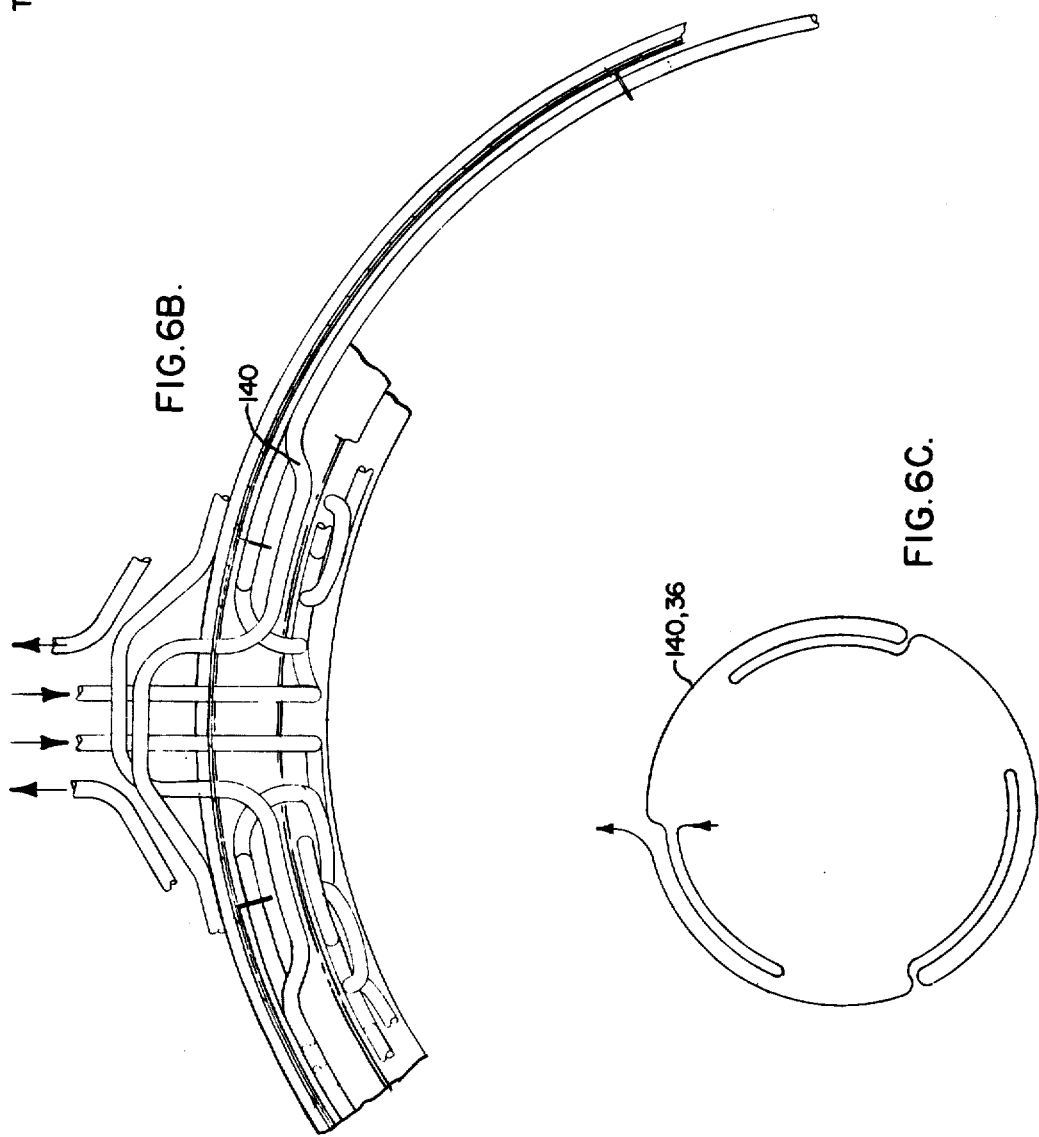

SYSTEM MgO–UO$_{2+x}$ IN AIR

SYSTEM MgO–UO$_2$; IDEALIZED

SYSTEM Al$_2$O$_3$–UO$_2$ PHASE DIAGRAM

APPARATUS FOR CONTROLLING MOLTEN CORE DEBRIS

BACKGROUND OF THE INVENTION

The invention described herein was made in the course of, or under, a contract with the Energy Research and Development Administration (ERDA) the successor in interest to the U.S. Atomic Energy Commission (AEC).

FIELD OF THE INVENTION

This invention relates to nuclear reactions, and in particular to an external vessel safety device which will disperse, dilute, contain, cool, and maintain subcritical molten debris formed in the unlikely event the reactor core melts through the bottom of its containing reactor vessel.

DESCRIPTION OF THE PRIOR ART

Since the inception of the commercial nuclear power industry, a prime concern of all parties involved has been safety. Regulatory bodies, commercial manufacturers, and operating utilities have spent vast sums in research, design and development of redundant systems and components to assure the safety of the public.

Governmental regulatory bodies define the safety related specifications for both commerical and other types of nuclear reactor plants, which are designed to protect against hypothetical accidents regardless of there likeliness of occurrence. One such unlikely hypothetical accident is based on assuming certain conditions under which auxiliary systems, which are designed to support plant functions during normal operation and to provide emergency functions under accident conditions, fail to the degree that at least a portion of the reactor core and its related components melt into a flowing configuration. The core, and supporting components within the reactor vessel which under such circumstances are assumed to melt, are further hypothesized to melt through the bottom of the thick walled steel reactor vessel. If an apparatus or system is not placed below the vessel to contain and cool this molten debris, it could react chemically and exothermally with the containment concrete. Hydrogen would also be released, which possibly could reach an explosive concentration. Although there is typically more than a sufficient quantity of reinforcing bars for containment and equipment structural support, some of the supporting structure could be damaged, along with the concrete, thereby exposing the molten debris to the environment below the containment. This has been referred to as the "China Syndrome." This would, at least theoretically, expose large amounts of hazardous radiation to the surrounding environment. Further, it has been suggested that if the molten debris is not cooled and dispersed, or diluted with neutron poisonous materials, it is possible, though unlikely, that a geometric configuration could form allowing at least a portion of the debris to attain criticality.

A number of apparatus have been disclosed which will act to contain, cool, and control the configuration of the assumed molten mass. However, none of these have provided the configuration and utilization of the specific materials of this invention. The utilization of alumina and magnesia, among other materials, provides a controllable melt front within the apparatus. Also, the configuration and material content of the receptacle dome disclosed herein not only acts to separate the flowing debris, but also directs it to different areas which can melt and dilute the mass as well as absorb neutrons through use of poisons such as tantalum. An apparatus which will, in the unlikely event of an accident, contain, cool, disperse, dilute, and poison flowing molten debris will ensure public and environmental protection, as well as serve to maintain the high degree of safety demonstrated by the operating record of the commercial nuclear power industry.

SUMMARY OF THE INVENTION

This invention provdes an apparatus which will perform the containing, cooling, dispersing, diluting, and poisoning function necessary to mitigate potential consequences of a major nuclear accident in the unlikely event one should occur. The apparatus, which is to be placed below the core of a nuclear reactor, comprises, in one embodiment, five main components. These include a funnel, a core debris receptacle, a bed, a cooling system, and a liner. The funnel directs molten debris which is assumed to penetrate the reactor vessel into the apparatus of this invention. The debris is initially contained in the core debris receptacle, which for example comprises alumina bricks, tantalum neutron poison, and a dome which acts to disperse the mass. The receptacle takes the major portion of the termal shock load from the debris which may reach temperatures in the range of 5000° F. If there is a sufficient amount of debris, it will slowly melt through the receptacle, being diluted and dispersed, and will flow into the bed. The bed comprises high melting point bricks, which will absorb heat and further dilute the debris by melting and dissolving, and which will transfer heat to the cooling system. The cooling system comprises conduits which circulate a coolant such as sodium in a prearranged pattern about the radial periphery and floor of the bed. It functions not only to remove heat from the bed, but also to cool the pool of reactor coolant, such as sodium, which will likely form above the molten debris. Surrounding the cooling system is the liner supported externally by insulating firebrick. The firebrick functions to maintain an acceptable temperature in the concrete of the containment lower cavity.

BRIEF DESCRIPTION OF THE DRAWINGS

The functions, components, requirements of the major components, and advantages of this invention will become more apparent from reading the following description in connection with the accompanying drawings, in which:

FIG. 2C is a view taken at C—C of FIG. 2B;

FIG. 2D is a detailed blowup view of a portion of FIG. 2A;

FIG. 3 is a view of the funnel of FIG. 2 showing a natural circulation flow path of the upper cooling system of FIG. 6;

FIG. 6B is a view taken at B—B of FIG. 6A;

FIG. 6C is a simplified schematic of a portion of the upper piping layout of the cooling system of this invention;

FIG. 6D is a simplified plan view schematic of the floor piping layout showing two redundant piping systems;

DESCRIPTION OF THE PREFERRED EMBODIMENTS

The invention disclosed herein evolved from safety considerations applied to nuclear reactor technology. It specifically provides an apparatus to disperse, dilute, contain, cool, and maintain subcritical, molten debris which has a potential of occurring in the unlikely event of an accident where not only a portion of the nuclear fuel melts, but a sufficient portion becomes molten to penetrate the bottom of the reactor pressure vessel. The embodiments to be described can be applied to any reactor containing a nuclear core, and are herein discussed with respect to the Fast Flux Test Facility (FFTF) Reactor and the present design of the Clinch River Breeder Reactor Project (CRBRP). A detailed description is provided for use with the FFTF reactor, and is then expanded for a larger reactor such as the CRBRP. The embodiments are basically similar, with primary differences resulting from the increased size of the CRBRP type apparatus relative to the FFTF type apparatus, and also in the elimination of a funnel in the CRBRP, discussed in detail below.

Figure 1:
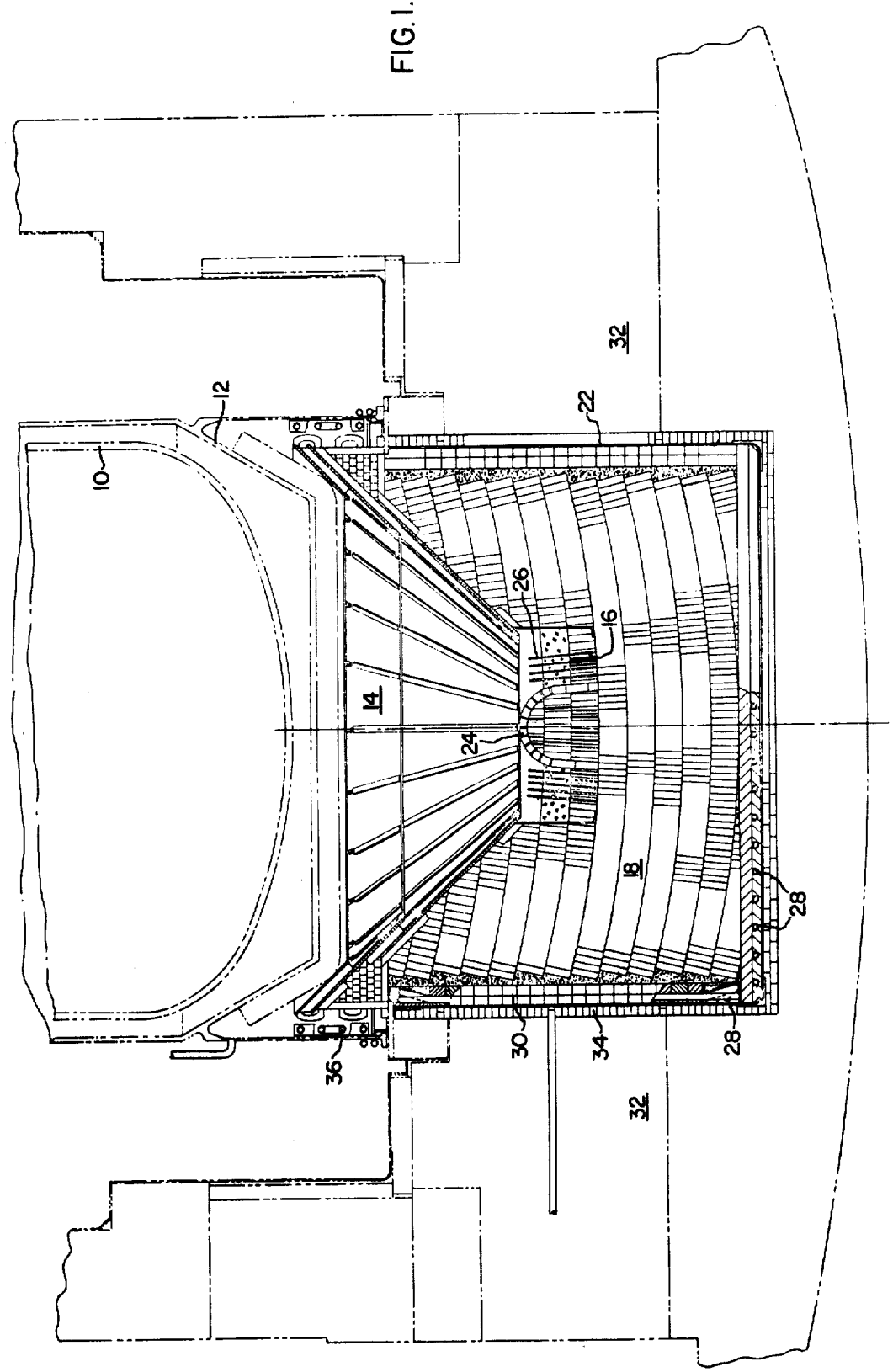
FIG. 1 is a view, in cross-section, of one embodiment of the disclosed invention.
Figure 2A:
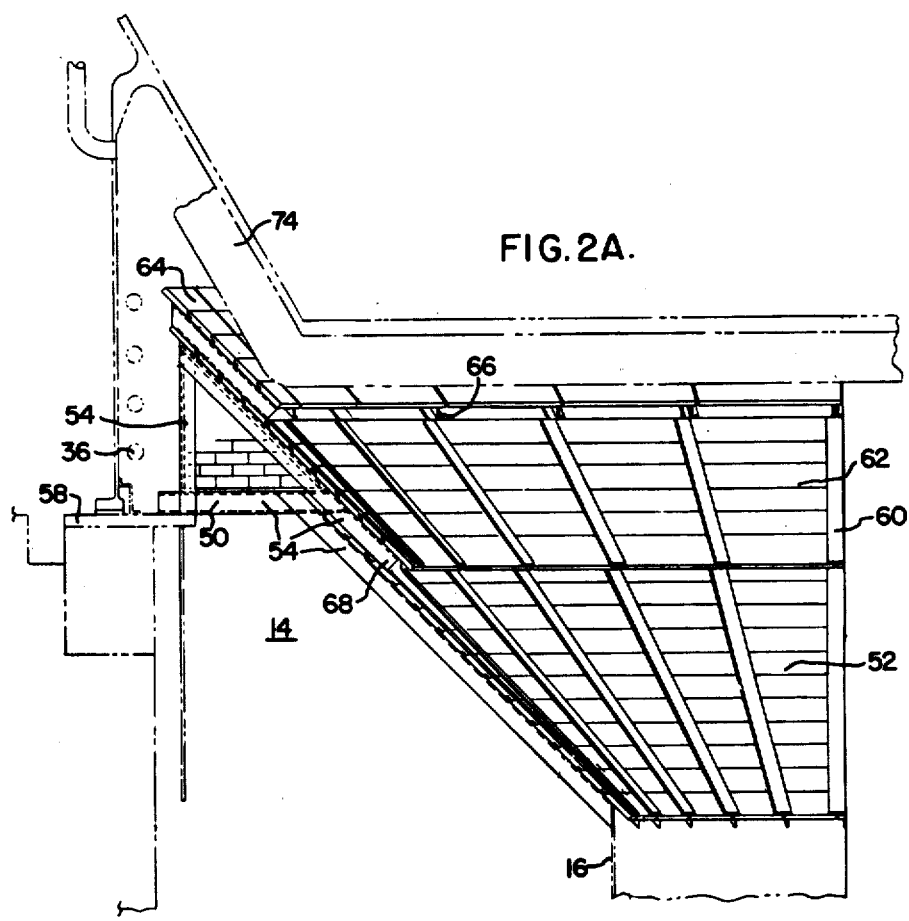
FIG. 2A is an internal elevation view of a portion of the funnel of FIG. 1.
Figure 2B:
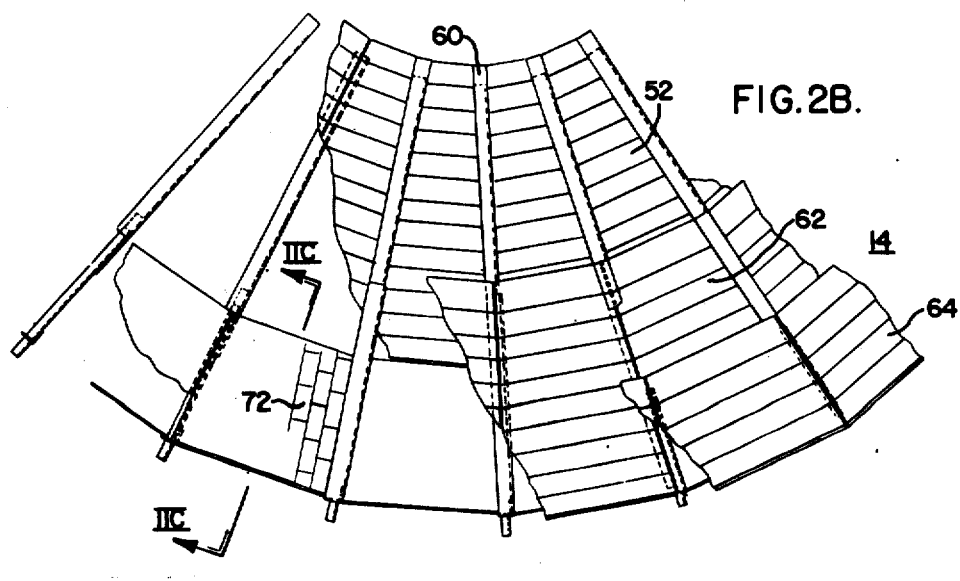
FIG. 2B is a top view of the funnel portion of FIG. 2A.

The apparatus is illustrated in FIG. 1. It is based upon an actively cooled sacrificial bed system which is intended to provide a receptacle below a reactor pressure vessel 10, to catch, contain and finally solidify the molten core debris which can be postulated to fall through the reactor vessel 10 following a hypothetical melt-through accident. Some reactors, such as the FFTF reactor, incorporate a guard vessel 12 below the reactor vessel 10.

The apparatus in this embodiment comprises five main components which are individually described below. The components are the funnel 14, core debris receptacle 16, bed 18, cooling system 20 and liner 22. The funnel 14 directs the core debris which is assumed to penetrate the guard vessel 12 into the center of the apparatus. The molten debris is initially collected in the core debris receptacle 16 which comprises a center dome 24 and tantalum poison rods 26 to prevent criticality of the molten or particulate debris. The core debris receptacle 16 also takes a major portion of the thermal shock load from the high temperature debris. The debris may reach temperatures in the range of 5000° F. If the debris melts through the receptacle 16 it will then slowly melt into the bed 18 material which absorbs heat by temperature increase and by melting, and transfers the heat to the cooling system 20. The cooling system 20 surrounds the bed 18 (walls and floor) and comprises cooling pipes 28 within a layer of graphite blocks 30. The cooling system extends up into the guard vessel 12 upper area and will remove heat from the coolant pool, such as a pool of sodium, which may form above the core debris. Surrounding the cooling system 20 is the liner 22 which is provided to prevent sodium from contacting the lower containment cavity and containment concrete 32. The liner 22 includes insulating and supporting firebrick 34 which will lower the concrete temperature at the lower cavity wall surface. The five main components are discussed individually below.

FUNNEL

The apparatus funnel 14 is provided to act as a guide to direct the core debris into the center of the apparatus from any point of assumed lower reactor vessel 10 melt-through. The funnel 14 will assure core debris channeling onto the apparatus in such a way that the bed 18 will eventually contain the molten core debris within its boundaries.

The funnel 14 extends outward radially to reach the inside diameter of the upper portion of the guard vessel 12, or radially outward beyond the vessel 10 outside diameter. The funnel 14 walls are sloped with a sufficient inclination so that fuel debris particles will slide down the funnel 14 surface. A 45° angle of slope is illustrated though it should be understood that the angle can vary and will preferably be in the range between 30° to 60°. The funnel 14 is designed to withstand the thermal shock associated with instantaneous contact by molten core debris, molten stainless steel and reactor coolant, without loss of integrity. Although not necessary, the component parts of the funnel 14 are desirably designed to be fabricated in small segments which can be transported into the containment lower cavity and assembled in place. The funnel 14 should also be structurally capable of accommodating seismic loads. After the funnel 14 has performed its function, it is expendable except that it should not fail in such a way as to adversely effect another component part of the apparatus. Further, the funnel 14 should incorporate flow passages to allow any coolant in the pool above the core debris to circulate by natural convection around the upper cooling coils 36 for removal of heat from the sodium, potassium, and mixtures thereof or other coolant, pool.

A funnel 14 which meets the above listed criteria is illustrated in FIGS. 2A, 2B, 2C and 2D. It has a generally inverted conical configuration with a multi-sided base 50 and comprises a series of plates 52 which are assembled to a structure of generally triangular frames 54. The funnel 14 shown in FIG. 2 has a 24 sided base 50 with a plurality of levels of 1 inch thick carbon steel plates 52 assembled to 24 triangular frames 54. The frames 54 are assembled as shown to form the inverted conical structure. The base, or outer cross channel 50 of each frame 54 is attached to and supported by a 2 inch thick steel guard vessel support ring 58. The inner part of the frame is attached to the core debris receptacle 16 cylinder which rests on the bed 18 bricks. The funnel plates 52 are laid in place and each one is welded 56 to the two frames 54 which support it. Steel joint strips 60 cover that part of the funnel plate joints above each frame which are not covered by the flow plates. Each strip 60 is continuously welded along both sides to each funnel plate 52. Above the funnel plates 52 is a series of flow plates 62 and a series of guard plates 64 which form a natural circulation flow path for the upper cooling coils 36, to cool any coolant pool. This cooling flow is shown in FIG. 3. The flow plates 62 are directly above the funnel plates and overlap the funnel plates by about 2.0 feet in this particular embodiment. The area between the overlapping sections provides a flow channel. The guard plates 64 and support 66 above the flow plates 62 and the area between them assures a flow path for the hot coolant. The flow plates 62 are supported by 24 flow plate support angles 68 which are part of the overall support frame. The angles form the uppermost part of the generally triangular support frames 54. Each flow plate 62 is welded to the two angles 68 on which it is supported. Joint strips 60 are welded to all the flow plates 62 to cover the joints between plates not covered by the guard plates 64. The channels 66 which support the guard plates 64 are welded to the flow plates 62 all along their length. The guard plates 64 are welded as shown to both channels which support them. Below the flow plates 62, in the region between the vertical and horizontal frames, are welded 0.25 inch carbon steel plates 70 which enclose a triangular section of bricks 72. These bricks 72 are preferably magnesia (MgO), but can also comprise such materials as thoria, urania, zirconia, alumina, tantalum, and graphite, among others. This region of bricks is a continuation of the bed 18 as a back-up to the funnel 14 and also is provided to complete the circular flow path the funnel 14 provides for coolant pool cooling.

In operation, any core debris resulting from a hypothetical melt-through that penetrates the reactor vessel 10 (and guard vessel 12) will fall on the inclined carbon steel surface of the funnel 14. The debris will slide down the surface and fall into the core debris receptacle 16 where the entire core debris is to be accumulated. It may also be carried down by the coolant. If the core debris sticks to the steel plates and locally melts the steel surface of the funnel 14, the molten steel should reduce the coefficient of friction between the debris and the funnel surface so as to assist the debris in sliding down the funnel 14 into the receptacle 16. The plates could comprise other steels or high temperature resistant materials, such as tungsten and molybdenum, among others, as well as base materials with high temperature resistant coatings. A melt-through of a layer of the steel surface should not affect the function of the other layers of the funnel 14. The brick 72 behind the steel plates will continue to direct any molten core debris into the core debris receptacle 16. The brickwork behind the flow plates also serves to insulate the hot coolant from the cooled coolant in the natural circulation loop.

The frame 54, flow 62, and guard plates 64 are arranged to form a circumferential conical inlet channel at the top of the funnel 14 and a similar outlet channel at the funnel support elevation. For natural circulation coolant pool cooling, hot coolant flows up the center of the funnel cavity and then outward along the bottom of the guard vessel insulation 74, as shown in FIG. 3. This hot coolant then passes through the inlet channel 76 and the funnel 14 and enters a plenum space above the funnel 14. The hot coolant passes downward around the upper cooling coils 36 where it is cooled. The cooled coolant then passes radially inward to the funnel plate upper surface where it flows downward toward the apparatus center. The cooled coolant is heated by the core debris and flows upward to the bottom of the guard vessel insulation 74 completing the coolant flow cycle. The temperature difference between the coolant being heated by the debris and the coolant being cooled by the cooling coils 36 will provide the thermal driving head to circulate the coolant.

CORE DEBRIS RECEPTACLE

Figure 4A:
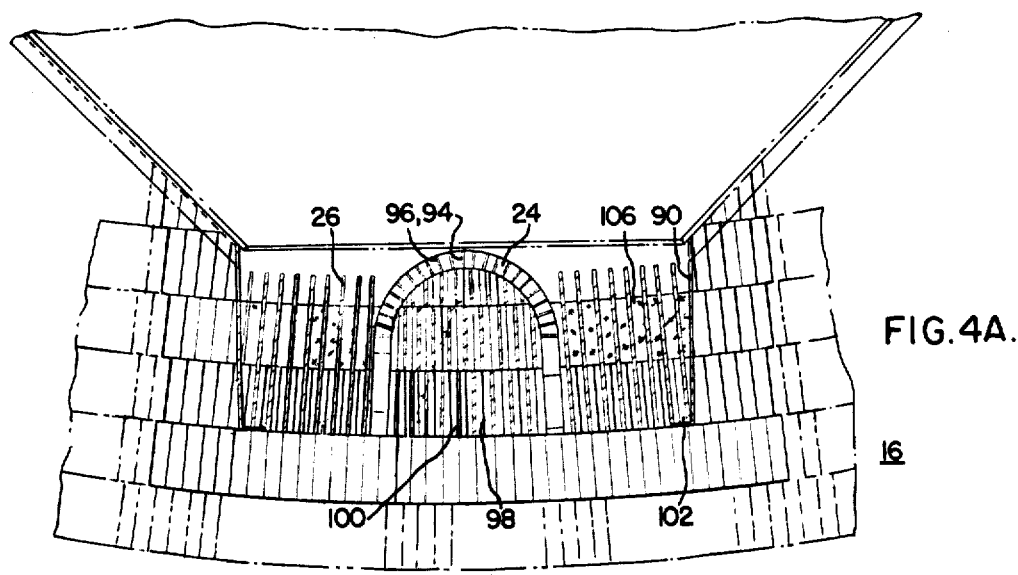
FIG. 4A is an elevation view, in cross-section, of the core debris receptacle of this invention and the surrounding medium.
Figure 4B:
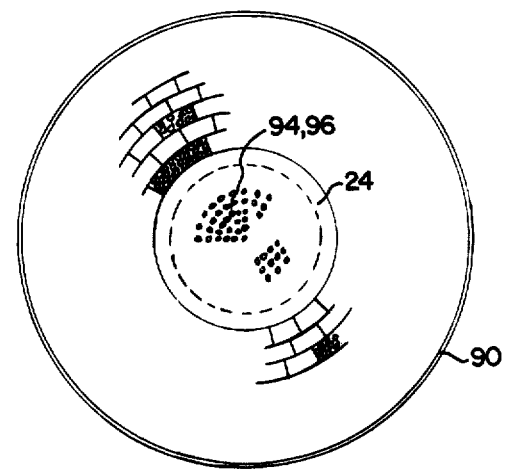
FIG. 4B is a partial top view of the receptacle of FIG. 4A.
Figure 4C:
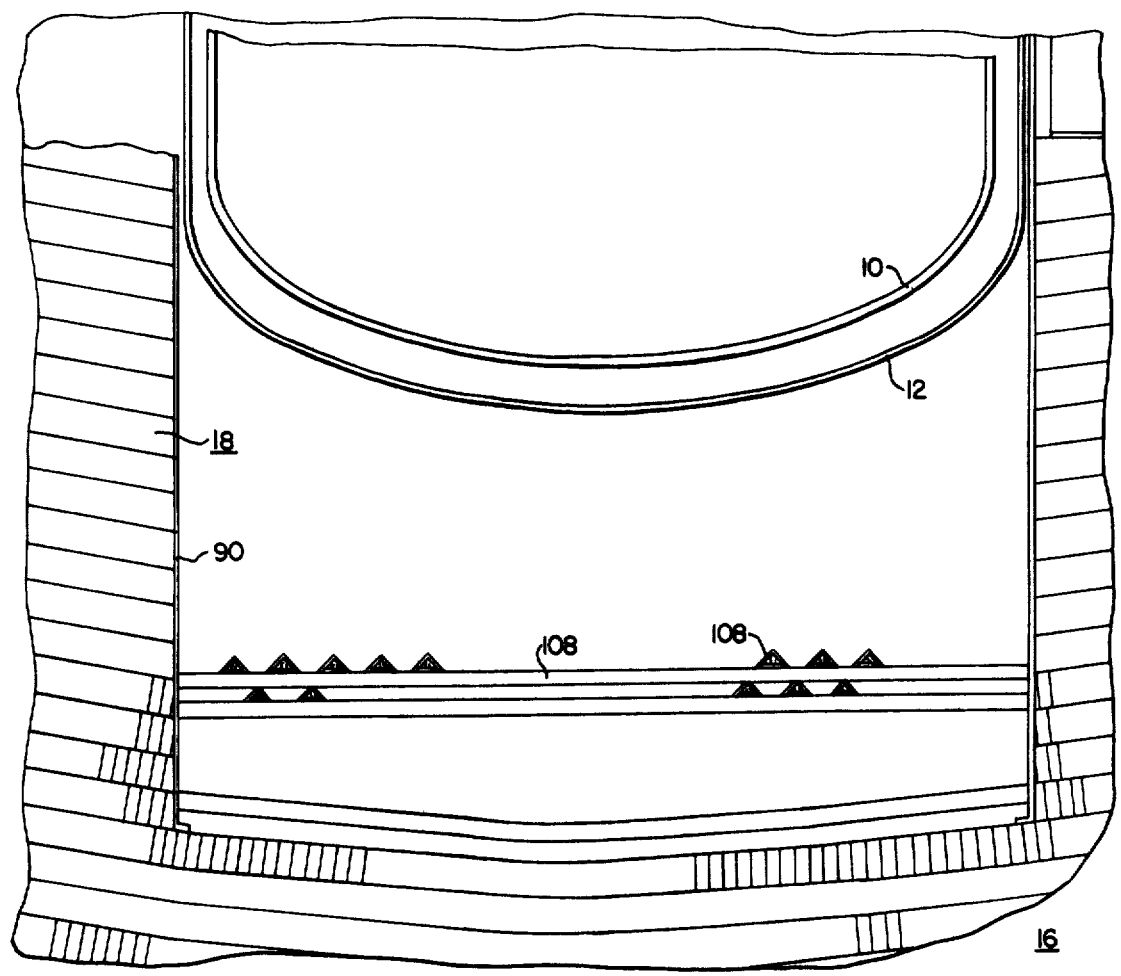
FIG. 4C is a cross-section, in elevation, of an alternate embodiment of the core debris receptacle.

The core debris receptacle 16 (CDR) is shown in FIGS. 4A, 4B, and 4C. Its primary function is to prevent the nuclear decaying fuel which is generating heat, and other molten debris, from assembling into a geometry that could result in criticality. To perform this function, the CDR 16 should accumulate the core debris into a predictable geometry which will be coolable and which will, after some period of time, be containable in the apparatus bed 18. The geometry of the CDR 16 should be such that the core debris will not assume a critical mass configuration. This can be accomplished by use of poison materials, and/or by limiting the depth that the core debris is allowed to reach in a self-leveled pool configuration. The CDR 16 should also remain intact following a seismic disturbance. However, it may be consumed after performing the functions outlined above.

One embodiment of the CDR 16 which meets the above criteria is constructed in a disc like array located at the center of the apparatus assembly. The CDR illustrated is approximately 7 feet in diameter and 3 feet high. The CDR cylinder 90, which may be carbon steel, encloses the CDR 16 and provides circumferential support at the bottom of the funnel frames 54. A generally spherical domed center piece 24 is designed to prevent the core debris from assembling in the center of the CDR 16 to form a critical mass of fuel materials. This center piece 24 may comprise blocks of alumina, magnesia, thoria, urania, zirconia, tantalum, graphite, or other high melting point materials. The preferred center piece 24 is an assembly of 98% alumina content blocks. The center dome blocks have radially directed holes 94 which contain tantalum rods 96. The inside of the dome is filled with blocks 98, preferably alumina, which have approximately 25% of their volume filled with tantalum 100. Other neutron absorber materials may be used in addition to, or instead of, tantalum. These include boron, cadmium, hafnium, gadolinium, silver, europium, and indium, among others as well as their chemical compounds. Also, configurations other than spherical, which function to disperse the debris may be utilized.

The center dome 92 is assembled within an outer layer of bricks 102 which also forms the bottom of the CDR 16. These bricks 102 may be of a high melting point material, and are preferably alumina with 25% of their volume filled with tantalum rods 26. These tantalum rods 26 extend upward approximately 18 inches above the bricks 102. Uranium oxide ($UO_2$) or other type pellets 106 are placed in between the outer tantalum rods 26 to form a layer approximately 12 inches above the bottom of the CDR 16. The pellet material should have a density equivalent to that of the molten fuel so that it will not flow on top of the molten debris.

It should further be miscible with the molten fuel, and have a melting point above 5000° F, to receive the initial thermal shock. A pelletized form is best to receive this initial thermal transient. This layer is composed of 25% tantalum, approximately 25% uranium oxide, and the remainder is void space filled with available gas. The gas is that gas available in the containment lower cavity, such as air, or an inert gas such as nitrogen, helium, or argon. Pellets of other materials, such as depleted nuclear fuels, tantalum, boron, cadmium, hafnium, gadolinium, silver, europium, indium, and their compounds, may also be used. At least a portion of the pellets should comprise depleted uranium to receive the initial thermal shock. FIG. 4C shows an alternative arrangement of the internal structure of the CDR 16. Here, a plurality of layers of generally triangular steel angles 108 internally containing a neutron absorber, such as boron carbide or any of the other poisons mentioned above, are arranged to disperse the molten debris. The angles 108 shown are arranged in alternating layers at 90° to each other. This configuration provides a dispersing function similar to the dome 92. The steel angles 108 will also melt, functioning to dilute the mass. The neutron absorber material will tend to maintain a subcritical condition. Pellets of uranium oxide and other materials may also be used throughout and above the layers to receive the initial thermal shock.

Under accident conditions, the core debris assumed to melt through the reactor vessel (and guard vessel) will initially accumulate in the CDR. The center dome 92 will disperse the debris (in either particulate or liquid form) so that it will spread out into the large annular space between the dome and the walls of the CDR 16. This spreading out of the debris will prevent it from assembling into a geometry that could result in a critical mass. The tantalum in the dome and in the surrounding annular space is the poison material which should inhibit criticality of the debris. The $UO_2$ pellets in the bottom of the receptacle will retard the advance of the molten debris as it drops toward the bottom of the CDR 16 and will reduce the thermal shock that the molten debris would impose on the alumina bricks 102 forming the bottom of the CDR. The CDR bricks and the initial layer of bed 18 bricks under and around the sides of the CDR, which may also be alumina, should have a relatively high resistance to thermal shock. The bulk of the bricks in the bed 18 are magnesia (MgO), as discussed below, which has a high heat capacity and is the preferred bed material.

The CDR 16 will likely melt in time as it holds a large amount of the core debris. Molten stainless steel in the core debris may form an alloy with the tantalum. The alumina blocks on the bottom of the CDR may also melt, thereby exposing more imbedded tantalum to the molten fuel which will further reduce the core debris reactivity.

BED

Figure 5:
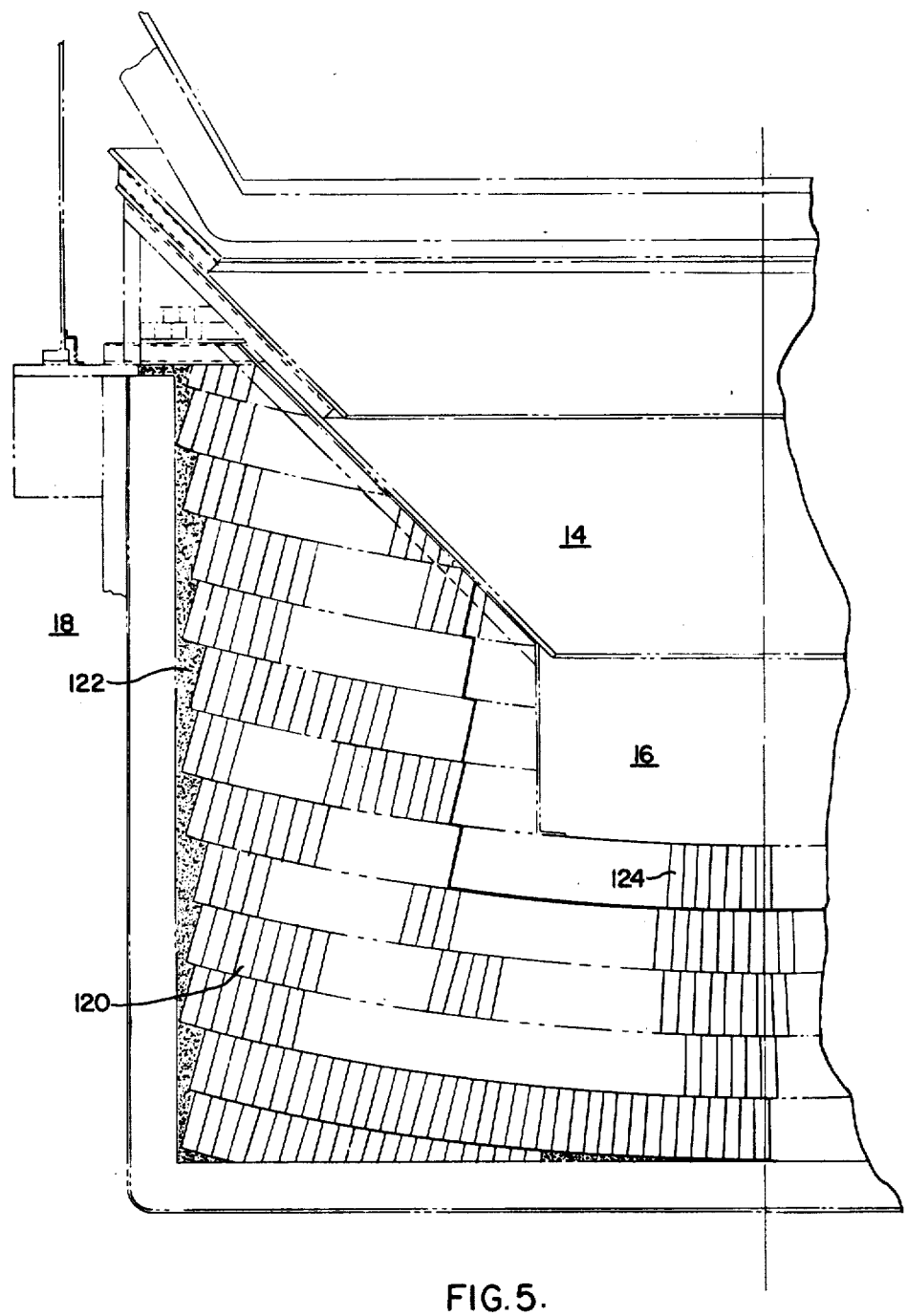
FIG. 5 is a partial cross-section, in elevation, of the bed of this invention.
Figure 6A:
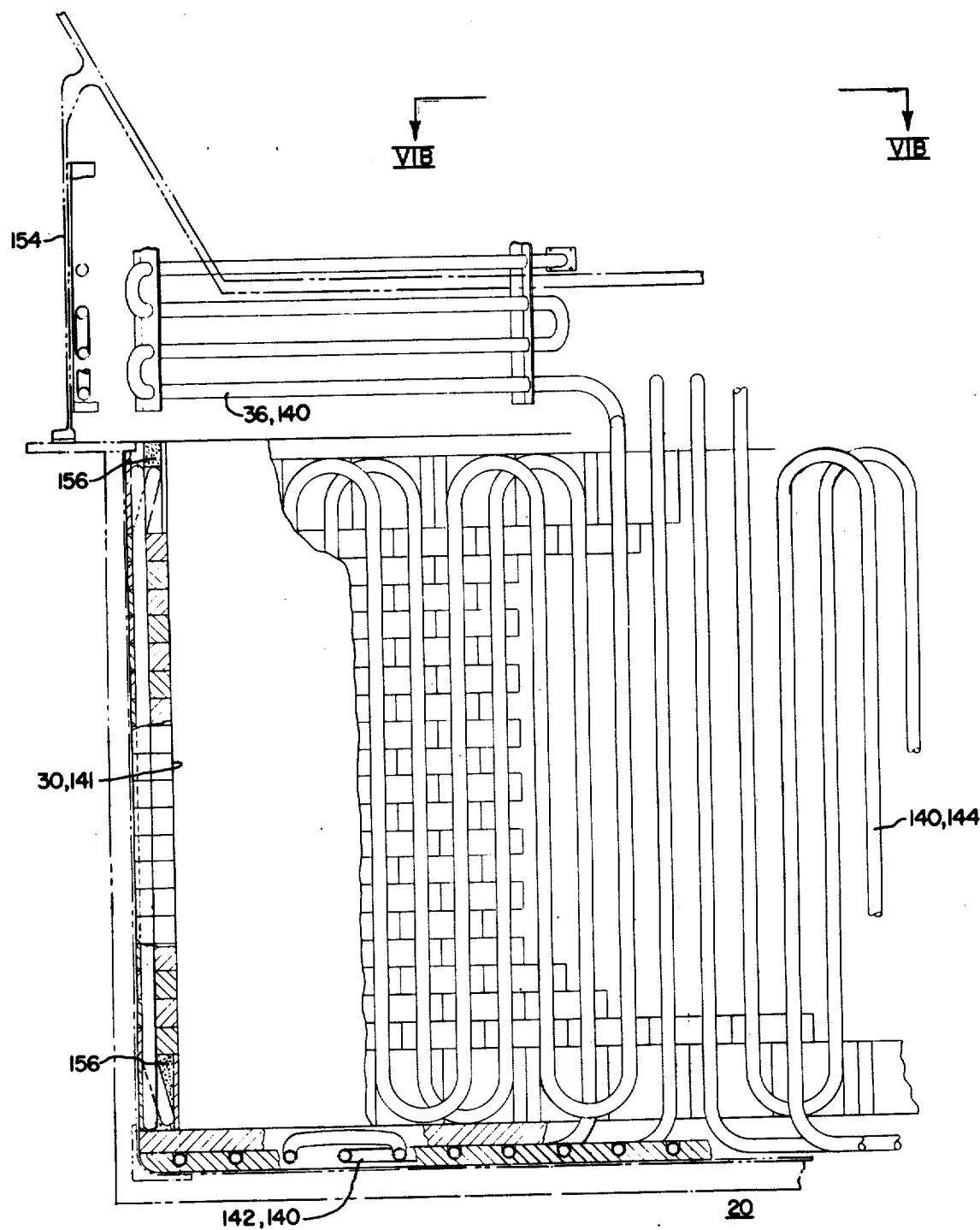
FIG. 6A is a partial elevation view of the cooling system of this invention.
Figure 6E:
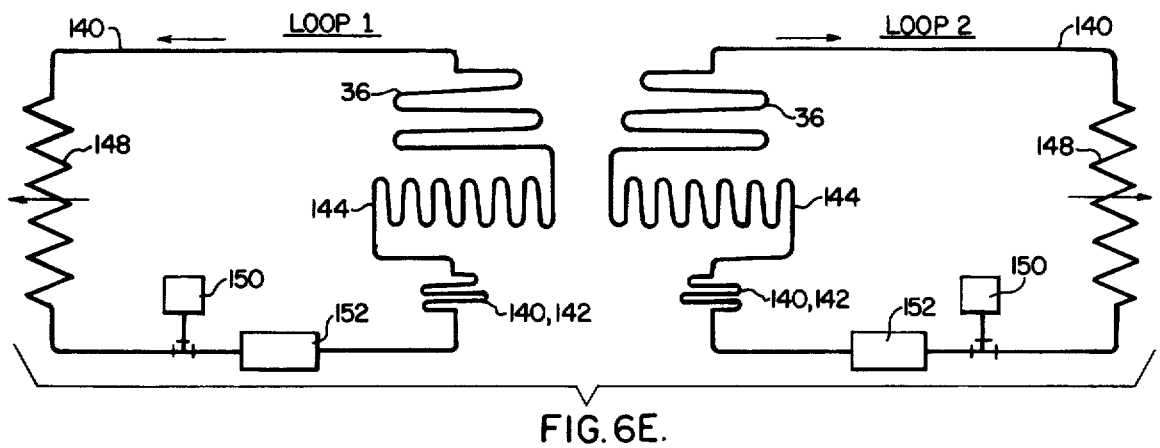
FIG. 6E is a simplified schematic of the piping layout and components of the cooling system of this invention.

The apparatus bed 18 is shown in FIG. 5. Its primary function is to further contain, dilute and quench the molten core debris melt front. The bed 18 should absorb the decay heat generated by the core debris and diffuse the heat load over a large area so that it can be absorbed and/or removed by the apparatus cooling system 20. To perform this function, the bed 18 should be designed to accommodate molten core debris such that the core debris will not violate any portion of the lower containment cavity or containment building concrete structures. The bed 18 should be composed of a material with a high melting temperature that forms a solution with the fuel material. The bed 18 should be constructed such that, under the thermal conditions imposed by the core debris, the bed material will not "float" when immersed in the dense molten core debris. In addition, the bed configuration should preclude intrusion of molten core debris into the bed material so as not to allow contact with or cause failure of the adjacent apparatus components it is designed to protect, such as the cooling system 20 and liner 22. The bed 18 should be capable of withstanding seismic loads both before and after an assumed melt-through accident. It should further interface structurally with the adjacent apparatus components in such a way as to preclude failures of these other components due to seismic or thermal expansion loads.

A bed 18 that meets these criteria is illustrated in FIG. 5 and includes a brick structure that fills the lower reactor containment cavity. The bed bricks 120 may be magnesia, thoria, urania, zirconia, alumina, or other such high melting point materials which are chemically compatible with the core fuel material. The preferred material is magnesia bricks, which are laid in generally inverted spherical arched layers. The joints between bricks in each layer are overlapped by the layer above and below. The bricks shown are twelve inches by nine inches by three inches with the long twelve inch sides forming the vertical layer thickness. The arch has the same radius for each layer. The bricks are tapered to wedge the arch into an integral structure without any mortar or binder in the brick joints. The bed 18 extends vertically from the bottom of the cooling system 20 to the funnel 14 and the core debris receptacle 16 with which it is integral. Partial bricks are used to fill in corners formed by irregular contours. On the vertical interface of the cooling system 20 and the bed bricks 120, an approximately 3 inch layer of powder, preferably MgO, is tamped in place. This maintains a tight structure and provides a cushioning effect for bed thermal expansion. Support bricks 124 which form the support (bottom and sides) for the core debris receptacle 16 may be alumina ($Al_2O_3$). The preferably MgO bricks 120 on the upper periphery of the bed 18 provide a back-up to the funnel 14. The magnesia bricks 120 under the funnel 14 will help to direct the molten core debris into the core debris receptacle 16 if the core debris should melt through the steel funnel 14.

During an accident, if the debris melts through the CDR 16, the bricks will dissipate the decay heat by absorbing the heat, rising in temperature, melting, and by conducting heat out to the apparatus cooling system 20. Bricks adjacent to the molten core debris will likely melt due to decay heat from the debris. The molten alumina and magnesia will function to dilute the molten core debris and cause the concentration of fuel in the debris to be reduced as is spreads out radially. The bed bricks 120, 124 are arranged in the inverted spherical arch configuration to lock the bed together. This should prevent the bricks from floating and also prevent formation of cracks between bricks. The staggered joints between the bed bricks will keep penetration of the molten core debris between the bricks in successive layers to a minimum.

COOLING SYSTEM

The apparatus cooling system 20 is shown in FIGS. 6A, 6B, 6C, 6D and 6E. Its primary function is heat removal to prevent failure of reactor plant concrete and to assure containment of the core debris within the apparatus. The apparatus is such that the cooling system need not be activated until some time after the accident, e.g. several hours. To perform this heat removal, the capacity of a cooling system 20 will vary with reactor size. For the FFTF, the cooling system 20 will remove approximately 2 MWt of heat from the lower cavity and the reactor coolant pool. To provide 100% redundancy, as is typically required by regulatory authorities, and for added safety, two cooling systems should be provided, each having the required heat removal capacity, to assure heat removal in the unlikely event one system should fail. The lower cavity cooling system 20 is positioned between the bed 18 and the lower cavity liner 22 to limit the maximum cavity concrete temperature below that of structural failure, and to protect the liner. A heat conducting medium 141 of high thermal conductivity may be provided between adjacent cooling pipes 140 to limit the temperature at the point half way between adjacent pipes of any one cooling system. The heat conducting medium 141 should also be capable of transmitting all structural loads (seismic, gravitational, thermal expansion) between the bed 18 and the cavity walls without significantly stressing the cooling system piping 140. The heat conducting medium should have a high melting temperature to protect the piping 140 from the transient heating effects (burnout) which might result from a small local intrusion of molten core debris into a gap or crack in the bed 18. The cooling system piping 140 on the bottom and sides of the bed 18 and above the lower cavity, may be connected in series. The coolant may be circulated by a pump in an external heat transport system (FIG. 6E), and desirably flows first to the piping 142 in the bottom of the bed, then to the piping 144 in the sides of the bed, and finally to the piping 36 in the upper portion of the guard vessel 12. Other components represented in FIG. 6 include a heat exchanger 148, a coolant supply tank 150, and a pump 152. The cooling pipes around the cylindrical sides of the bed should function to accommodate the maximum radial heat flux which could occur at any local point on the bed so that the pipe spacing is constant. The cooling system piping in the bottom of the bed should also be designed to accommodate the maximum downward heat flux which could occur at any local point so that the pipe spacing on the bottom of the bed is generally constant. The bed cooling system 20 should further be able to accommodate thermal expansion. The piping design should be able to accommodate the relative movement between the piping 140, heat conducting medium 141, the liner 22 and the bed material as the center of the bed is heated by the core debris. The cooling system piping 140 should be able to withstand the thermal shock of sudden contact with reactor coolant at temperatures up to 1700° F following assumed contact with both coolant and the heat conducting material 141 for an extended period of time. The bed cooling system 20 should preferably be fabricated in segments which can be brought into the lower cavity through available access and assembled and tested inside the cavity. Desirably, the cooling system 20 should also be able to withstand seismic loads before, during and after the assumed melt-through accident.

A cooling system which meets the above criteria, shown in FIG. 6, comprises a floor and wall cooling system supported on and enclosed in graphite blocks 30, and coolant pool under cooling coils 36. Both portions, for the FFTF, have 3.0 inch diameter pipes, with a 0.125 inch wall, which runs back and forth in a zig-zag fashion across the floor and up and down the walls. The coolant fluid for each system is preferably a mixture of sodium and potassium because of its good heat transfer characteristics, compatibility with the apparatus materials, and its low melting ($\sim 10°$ F) and high boiling ($\sim 1400°$ F) temperatures. Other cooling fluids, such as sodium or potassium individually, or coolants compatible with the reactor coolant, may also be used.

The cooling system piping 140 enters the apparatus through the upper portion of the guard vessel, or support skirt 154, and drops down the wall to the floor level of the cavity. The two separate systems circle the lower cavity in opposite directions for approximately 90° (180° apart) and then proceed to cover the floor with a zig-zag pattern with hairpin (90°) turns on each end, as shown in FIGS. 6C and 6D. The pipes in each system are 24 inches apart (center-to-center) with the second system being "nested" in the first system so that the centerlines of adjacent pipes are on twelve inch parallel centers and flow is in opposite directions for better thermal distribution. Once the pipes 140 have crossed the floor they are routed back near the point of entry and begin the same zig-zag pattern in opposite directions around the wall with the straight sections running vertically and the hairpin turns on the top and bottom of the wall. Nesting may be used to obtain a minimum spacing of 9 inches between pipes in the two systems. After the pipes have nearly returned to the start of the wall system, the pipes are routed up into the guard vessel support skirt 154 area where they again zig-zag back and forth up the shirt. Three separate series of zig-zags are made by each system with the pipes passing through the guard vessel skirt support 154 to continue around the periphery. The pipes can be hung from two sets of hangers per zig-zag. The pipes can be attached to one hanger with the other hanger being a free floating connection to allow for expansion. This upper portion of the cooling system primarily serves to cool the coolant pool which may form and which, if not controlled, could overheat and damage the concrete liner, guard vessel, and support structures.

Graphite blocks 30 are used to support the cooling system pipes 140. The graphite also acts as the thermal conducting medium 141 to spread the heat load over a larger number of cooling pipes and to act as a protective barrier to mechanical loads from the bed 18. The floor cooling pipes are supported on 4 inch thick graphite blocks 30 which are machined to accept the pipe. The pipe on the side wall rests on the graphite blocks forming the floor and serves to support the graphite blocks going up the wall. The wall cooling pipes are also fit into machined grooves in the graphite blocks. A second layer of graphite blocks about 5.0 inches thick is added to help distribute the thermal load from the bed. The top and bottom portions of the wall cooling system are filled with powdered graphite 156 to allow for the overlapping configuration of the cooling pipes and to permit axial thermal expansion of the pipes. The graphite blocks may thus be sized to be easily handled. Other materials, which have a fairly low melting point, may be used alternatively to the graphite. Those materials commonly referred to as babbit or white metals, such as lead, bismuth, antimony, and tin, copper, and other alloys, are applicable.

From an operational standpoint, the zig-zag pattern is judged best when considering thermal expansion, even though it represents a significant increase in pressure drop over other alternatives which may be used, such as a spiral and helix flow system. The use of graphite as the heat conducting media is based upon graphite being a good heat exchange medium, it has a relatively high compressive strength at operating temperature, and is economical.

CAVITY LINER

Figures 7A, 7B:
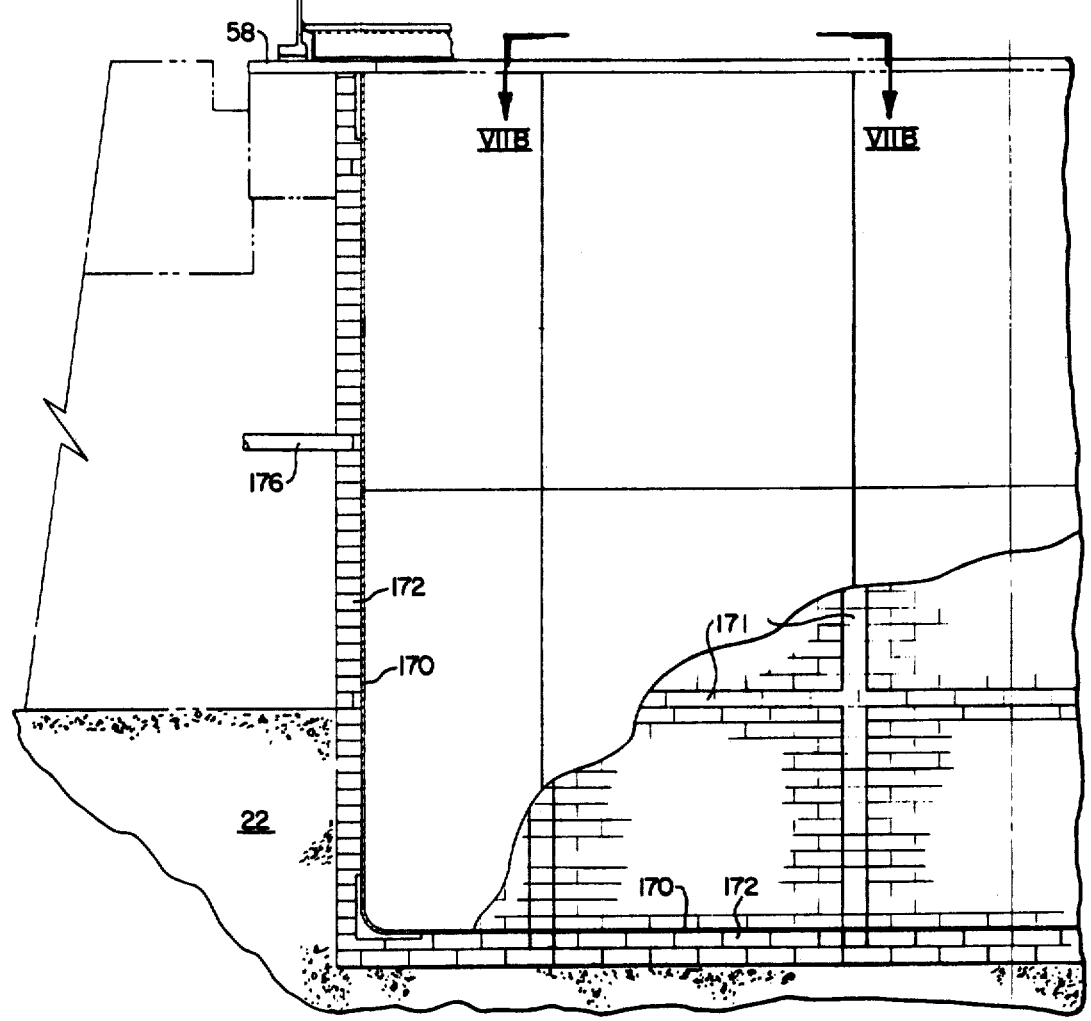
FIG. 7A is a partial section view, in elevation, of the cavity liner of this invention.
FIG. 7B is a view taken at B—B of FIG. 7A.

The cavity liner 22 is shown in FIGS. 7A and 7B. Its primary function is to prevent coolant from coming into contact and reacting with the lower cavity concrete 32. The liner 22 is designed to allow any steam generated in the heated concrete 32 to escape from the lower cavity area.

To perform this function, the liner 22 should form a continuous leak tight barrier. The liner 22 should be capable of operation for an extended period of time at temperatures up to 800° F while in contact with both reactor coolant and apparatus structural materials. The liner 22 is also constructed to withstand the initial thermal shock of contact with reactor coolant (approximately 400° to 1700° F) and the pressure due to the static head of coolant above the lower cavity floor. The liner 22 should have provisions for venting any steam formed in the concrete walls behind the liner to a space outside the cavity. It should further be able to withstand seismic loads between the bed 18 and the cavity walls both before and after melt-through. And, the liner 22 should be able to accommodate its own thermal expansion and the forces generated by thermal expansion of the bed 18.

A liner 22 which meets the above criteria is illustrated in FIG. 7A and comprises a thin walled circular metal shell 170 surrounded by a wall of insulating firebrick 172. The liner is sandwiched between the lower cavity concrete 32 and the apparatus bed 18, as shown in the Figure. The liner shell 170 may be fabricated in the lower cavity area from welded carbon or other type steel plate. A leak tight container is formed by welding the top of the shell 170 to the lower surface of the guard vessel support structure 58. The shell 170, for the FFTF, has a nominal diameter of 242 inches, a height of 168 inches and weighs about 24,000 pounds. The 0.5 inch thick shell material is ASTM A516, Grade 70 Pressure Vessel Plate. The bottom seam between the floor shell and wall shell is rounded to allow for limited thermal expansion.

The firebrick insulation 172 laid in the lower cavity area behind the steel shell may be a high density, high temperature fireclay (Silica-Alumina) with a minimum cold crushing strength of 2000 psi. Nominal brick size is 3 by 4½ by 9 inches and covers the floor to a depth of 6 inches and the walls to a depth of 4.5 inches. Grooves 171 in the firebrick crisscross those surfaces adjacent to the steel shell. The firebrick around the floor-wall interface is cut back to a depth of 1.0 inch for a 1 foot length up the wall and a 1 foot width along the floor to allow for limited thermal expansion of the steel shell 170. The firebrick at the top of the wall is also cut back 1.0 inch deep one foot from the top.

Under accident conditions, if debris such as liquid sodium is allowed to reach the concrete 32, the ensuing chemical reaction could be detrimental to the concrete and could adversely effect the structural capabilities of the lower cavity walls. The shell 170 acts to prevent this. Carbon steel is preferred as a shell material because it is economical. It also is resistant to sodium attack for temperatures up to 930° F, its welds show no preferential attack by liquid metal coolants such as sodium, and steel is suitable to use as a structural member up to about 900° to 1000° F. Many other metals have these physical properties, and could also be used. Any steam released from the heated concrete on the underside of the liner will accumulate in a system of grooves 171 in the fireback insulation. Vent pipes 176 are provided to allow any steam to escape the lower cavity into the adjacent containment structures. This will minimize any problem of pressure building up behind the liner 22 and possibly causing a rupture. For strength, the thin flexible steel shell 170 should be positioned firmly between the concrete walls of the lower cavity 32 and the apparatus bed material. The firebrick 172 behind the steel shell is designed to provide a rigid connection between the steel shell 170 and the concrete 32. The firebrick 172 also is expected to provide insulation for the concrete walls which must typically be maintained below about 800° F. The liner 22 could easily be fabricated inside the lower cavity area prior to insulation of the apparatus cooling system 20, bed 18 and funnel 14, if any. For example, first, the layer of firebrick 172 could be installed with a high temperature air-setting mortar. The shell 170 could then be fabricated on top of the firebrick 172 using standard welding and inspection procedures. Expansion joints could also be incorporated in the floor and walls of the steel shell 170, although not deemed necessary.

As mentioned above, alternative materials can be used in the bed 18. The mentioned oxide materials in high density form could provide an adequate apparatus bed for retention of the core debris in conjunction with the apparatus cooling system 20. The heat loads, melt times and pool sizes for the urania, magnesia, alumina, thoria, zirconia and titania are such that they would perform the desired function. However, to contain the core debris, magnesia and alumina are able to limit the pool growth better than the rest of the materials. In addition, magnesia and alumina are the most commercially available of these materials. A magnesia bed, on the basis of its heat capacity, will provide adequate core debris retention within the boundary of the bed. The bed also contains alumina and urania as materials to absorb the initial thermal shock and to dilute the core debris pool.

Figure 8A:
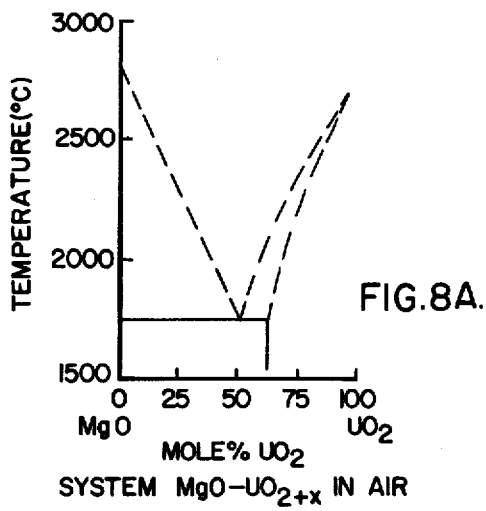
FIG. 8A is a phase diagram of the materials used in one embodiment of this invention, showing their properties in air.
Figure 8B:
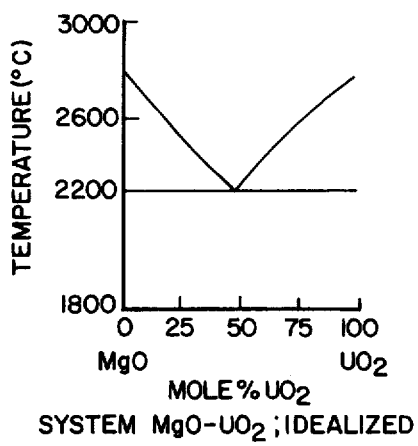
FIG. 8B is a phase diagram of the materials used in one embodiment of this invention, showing their idealized properties.
Figure 8C:
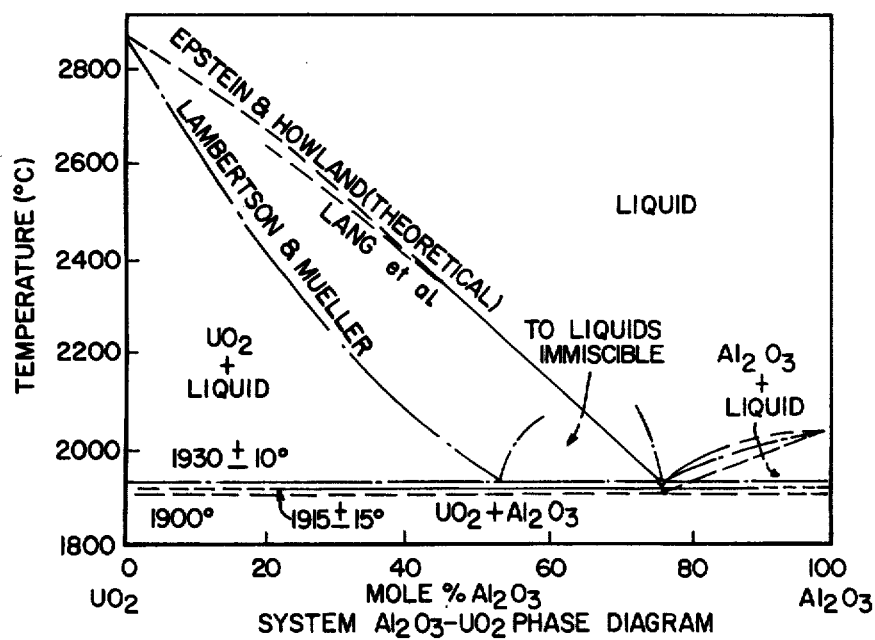
FIG. 8C is a phase diagram of the materials used in one embodiment of this invention.

The dynamics of the melt front development are dependent upon the solubility and miscibility characteristics of the molten fuel and bed material. For a light bed material with a low melting point which is immiscible with fuel, it is likely that the pool of molten fuel could sink into the bed relatively rapidly. However, for the preferred materials, (magnesia and alumina) such behavior is not predicted. Although the densities of magnesia and alumina are less than that of the molten fuel, these bed materials have been shown to be miscible with, and soluble in, the fuel material. Further, they are theoretically predicted to form low melting point eutectics as shown in the phase diagrams, FIGS. 8A, 8B, and 8C. These diagrams are contained in the *Journal Of The American Ceramic Society*, Vol. 36, No. 10, October 1953, p. 334, "Binary Mixtures Of $UO_2$ And Other Oxides," L. F. Epstein and W. H. Howland. Therefore, if an accident arises, initially the fuel mixes with the bed of granulated urania which is present to reduce the initial thermal shock on the bed. These materials will theoretically mix into a pool with a volume about twice that of the fuel and a volumetric heating rate about half that of the initial fuel volume. The urania pool then initiates a melting attack on the layer of alumina in the bed. The alumina is used for its good thermal shock characteristics. The pool as it melts into the alumina constitutes a liquid containing mainly urania and alumina. If there is a temperature gradient in the liquid, then alumina will theoretically tend to be precipitated leaving a eutectic pool. This indicates that an alumina crust is quite possible on top of the pool. As this pool melts into the magnesia, it will tend to become magnesia rich due to the relatively large quantity of magnesia available. The pool, then, predicted to become selflimiting due to conduction through the bed to the cooling system, the reducing decay power, and the reduced flux at the pool boundary.

Figure 9A:
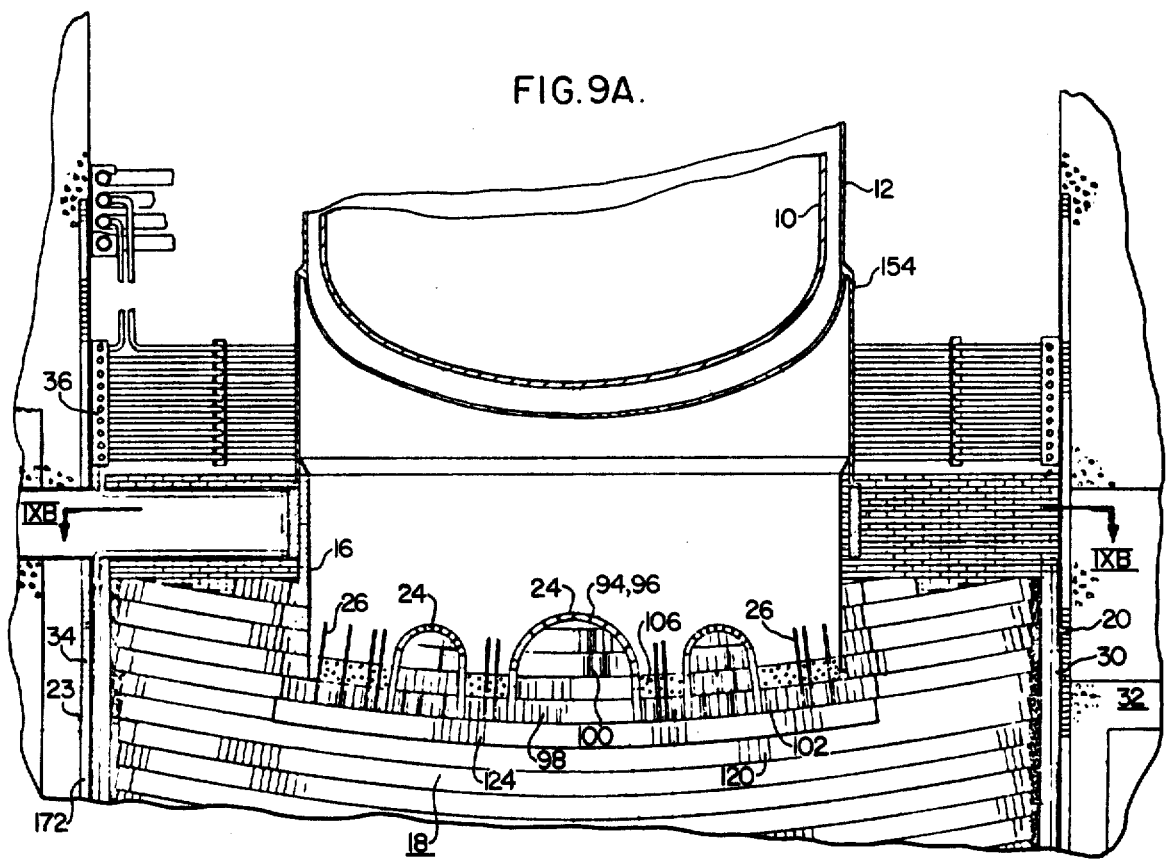
FIG. 9A is a view, in cross-section, of a larger embodiment of the invention disclosed.
Figure 9B:
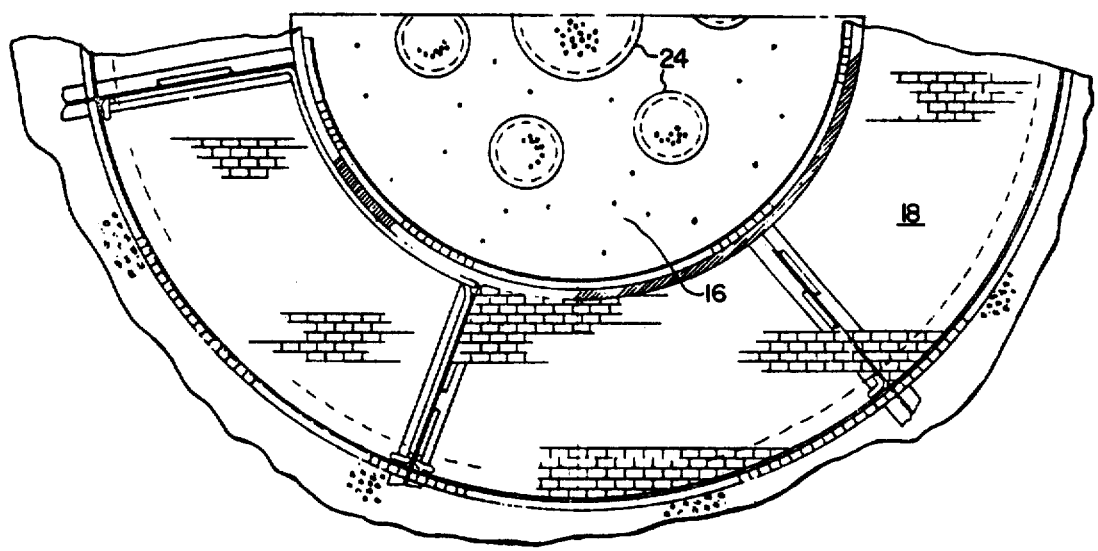
FIG. 9B is a view taken at B—B of FIG. 9A.

The above discussion has provided a detailed description of the invention, although discussed specifically in relation to the FFTF. For larger or smaller reactors, the capacity, size, and number of individual components would, of course be varied. An embodiment for use in a larger liquid metal reactor, such as the Clinch River Breeder Reactor Project (CRBRP), is shown in FIGS. 9A and 9B. It is basically similar to the above discussed embodiment, except the funnel 14 has been eliminated and a plurality of dispersers or domes 24 are utilized, as the reactor is larger. The materials of each component are also similar to those discussed above. A funnel is not necessary as the diameter of the core debris receptacle 16 is as large as the reactor vessel 10 diameter. The molten debris will fall directly onto the center domes 24 and into the receptacle 16. Also, the upper cooling coils 36 may be attached to the reactor cavity walls with the elimination of the funnel.

It is therefore seen that the disclosed invention is capable of dispersing, containing, cooling, and maintaining subcritical the molten debris released in the unlikely event of a major nuclear accident wherein the molten debris melts through the bottom of the reactor pressure vessel. The invention will limit the core and other debris melt front progress within boundaries of the bed. It also will maintain the concrete within the lower cavity of the reactor containment, and other containment structures, below temperatures at which failure might otherwise occur. Further, the apparatus will function to provide sufficient time so that the cooling system of the apparatus may be shut down when the core debris decay heat can be dissipated by the heat capacity of the reactor containment structures. Although discussed primarily in relation to liquid metal cooled fast breeder reactors, the invention disclosed herein may be utilized to mitigate the consequences of postulated failures in other reactor types which assume melting through the vessel containing the core and fuel. The only modifications need be insuring that the cooling system coolant is compatible with the reactor coolant (an added safety margin), and changing at least some of the pellets to a depleted form of the nuclear fuel used, and combining them with pellets of uranium compounds.

We claim:

1. Apparatus for controlling molten debris from meltdown of a nuclear reactor core, said core being contained in a reactor vessel and including nuclear fuel, said vessel also containing a circulating liquid coolant, wherein said debris melts through the bottom of said reactor vessel causing said debris and said coolant to fall, said apparatus disposed below said vessel and comprising:

a. at least one debris receptacle comprising:
  i. at least one generally spherical upwardly convex dome comprised of dome blocks which blocks are comprised of a high melting point material and at least some of which blocks have neutron poison rods therein;
  ii. a plurality of bricks positioned radially about said dome comprised of a high melting point material, at least some of said bricks having neutron poison rods therein which extend above said bricks; and
  iii. a layer of pellets positioned above said bricks and about at least a portion of the rods of said bricks, said pellets comprised of a material having a density at least equivalent to that of said molten fuel and being miscible with said molten fuel; and
 b. means disposed below and radially about said bricks and pellets for supporting and controlling said dome, bricks and pellets.

2. Apparatus of claim 1 wherein said high melting point material comprises at least one of alumina, magnesia, thoria, urania, zirconia, and graphite.

3. Apparatus of claim 1 wherein at least some of said neutron poison rods are comprised of a material including tantalum.

4. Apparatus of claim 1 wherein said liquid coolant comprises at least one of sodium and potassium.

5. Apparatus of claim 1 wherein said support and control means comprise:

a bed comprised of a plurality of generally spherically arched concave layers of bed bricks of a high melting point material wedged together to form an integral structure, said layers radially surrounded by an adjacent tightly packed high melting point powder.

6. Apparatus of claim 5 wherein said support and control means further comprise:

a liner positioned below and radially about said bed comprised of an inner metallic shell having a side wall and a bottom, said wall and bottom joined by a rounded seam, an outer shell of insulation having a system of grooves therein adjacent said inner shell and also being spaced from said inner shell at preselected locations so as to allow thermal expansion of said shell, and means in fluid communication with said system of grooves for venting any pressure buildup about said liner.

7. Apparatus of claim 5 wherein said support and control means further comprise:

means positioned below and radially about said bed for cooling said bed comprising piping and means for circulating a cooling fluid chemically compatible with said coolant through said piping, said piping partially enclosed in a solid heat conducting medium comprised of a material having a high thermal conductivity and a relatively high compressive strength, and partially enclosed in a powder disposed to permit axial thermal expansion of selected portions of said piping.

8. Apparatus of claim 1 further comprising means for funneling said debris and coolant from said vessel to said receptacle and for inducing natural circulation cooling of said debris and coolant comprising:

a. a plurality of funnel plates arranged on a series of supporting frames so as to form an integral generally inverted truncated conical shaped lower flow surface, a plurality of flow plates arranged on a series of supporting frames so as to form an integral generally inverted truncated conical shaped upper flow surface, said upper flow surface spaced above and overlapping the upper portion of said lower flow surface, and b. cooling piping positioned within a structural enclosure spaced radially about said upper flow surface, and c. means for circulating a cooling fluid through said piping, whereby when said debris and coolant falls a pool of coolant is formed above said receptacle and about said funneling means, said pool being cooled by natural circulation including passage of said coolant from a location adjacent said piping, downwardly through the space formed by said overlapping, and upwardly over said upper flow surface.

9. Apparatus for controlling molten debris from meltdown of a nuclear reactor core, said core being contained in a reactor vessel, wherein said debris melts through the bottom of said reactor vessel, said apparatus comprising:

a. at least one core debris receptacle, said receptacle comprising:
  i. at least one generally spherical dome piece, said dome piece comprising first alumina dome blocks, said dome blocks including holes, first neutron poison rods of tantalum positioned in said holes, said dome piece containing therein second inner blocks of alumina, said inner blocks comprising tantalum neutron poison;
  ii. at least one layer of alumina dome outer bricks surrounding said dome piece, said outer bricks containing second neutron poison rods of tantalum extending above said bricks;
  iii. uranium oxide pellets above said outer bricks and about at least a portion of said second neutron poison rods; and
  iv. a continuous, generally cylindrical steel receptacle shell about the periphery of said outer bricks and said second poison rods;

b. a bed surrounding at least the radial periphery and bottom of said core debris receptacle, said bed comprising:
  i. generally inverted spherically arched layers of bed bricks, said bed bricks comprising an inner section of alumina ($Al_2O_3$) and an outer section of magnesia (MgO); and
  ii. a layer of magnesia powder about the periphery of said bed bricks;

c. a liner surrounding the radial periphery and bottom of said bed, said liner comprising:
  i. a generally cylindrical steel shell with an open top and continuous bottom;
  ii. insulating silica-alumina firebrick surrounding the periphery and bottom of said shell; and
  iii. means for venting any pressure buildup about said liner; and d. means to cool at least one of said bed and said liner, said means comprising:
  i. floor and wall piping positioned about and below said bed;
  ii. graphite cooling blocks enclosing at least a portion of said piping;
  iii. a liquid coolant, said coolant comprising at least one of sodium and potassium;
  iv. a heat removal sink external to said apparatus, said sink comprising a heat exchanger and being in fluid communication with said piping; and
  v. means for circulating said liquid coolant through said piping and said heat exchanger.

* * * * *